(12) United States Patent
Yoon

(10) Patent No.: US 8,771,866 B2
(45) Date of Patent: Jul. 8, 2014

(54) POUCH TYPE SECONDARY BATTERY AND THE FABRICATION METHOD THEREOF

(75) Inventor: Jangho Yoon, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 280 days.

(21) Appl. No.: 13/020,759

(22) Filed: Feb. 3, 2011

(65) Prior Publication Data

US 2011/0244315 A1 Oct. 6, 2011

Related U.S. Application Data

(60) Provisional application No. 61/319,135, filed on Mar. 30, 2010.

(51) Int. Cl.
| | | |
|---|---|---|
| *H01M 2/00* | (2006.01) | |
| *H01M 2/36* | (2006.01) | |
| *H01M 2/06* | (2006.01) | |
| *H01M 2/02* | (2006.01) | |
| *H01M 10/0525* | (2010.01) | |
| *H01M 2/20* | (2006.01) | |
| *H01M 2/04* | (2006.01) | |

(52) U.S. Cl.
CPC .............. *H01M 2/361* (2013.01); *H01M 2/265* (2013.01); *H01M 2/06* (2013.01); *H01M 2/0267* (2013.01); *H01M 2/021* (2013.01); *H01M 10/0525* (2013.01); *H01M 2/0217* (2013.01); *H01M 2/204* (2013.01); *H01M 2/0207* (2013.01); *H01M 2/0413* (2013.01); *Y02E 60/122* (2013.01)
USPC ........... 429/163; 429/129; 429/130; 429/131; 429/138; 429/139; 429/144; 429/153; 429/167; 429/177; 429/178; 429/179

(58) Field of Classification Search
CPC .......... H01M 10/0413; H01M 2/0207; H01M 2/361; H01M 2/365; H01M 2/021; H01M 2/0267; H01M 2/06; H01M 10/0525; H01M 2/0217; H01M 2/204; H01M 2/0413; Y02E 60/12
USPC ......... 429/129–131, 136, 138–142, 144, 153, 429/163, 167–168, 171, 175–179, 188
See application file for complete search history.

(56) References Cited

U.S. PATENT DOCUMENTS 6,371,996 B1 * 4/2002 Takayama et al. ............ 29/623.2
6,503,656 B1    1/2003 Bannai et al.
(Continued)

FOREIGN PATENT DOCUMENTS

| CN | 1271972 | 11/2000 |
|---|---|---|
| CN | 1992380 | 7/2007 |

(Continued)

OTHER PUBLICATIONS

Extended European Search Report dated Jul. 20, 2011 in Application No. 11250350.

(Continued)

*Primary Examiner* — Patrick Ryan
*Assistant Examiner* — Ben Lewis
(74) *Attorney, Agent, or Firm* — Knobbe Martens Olson & Bear LLP

(57) ABSTRACT

A method of forming a secondary battery comprises: positioning an electrode assembly between a first pouch sheet and a second pouch sheet; initially sealing outer portions of the first pouch sheet and of the second pouch sheet on at least one side of the first and second pouch sheets; and additionally sealing outer portions of the first pouch sheet and of the second pouch sheet on the at least one side of the first and second pouch sheets.

20 Claims, 11 Drawing Sheets

(56) References Cited

U.S. PATENT DOCUMENTS

| | | | |
|---|---|---|---|
| 2002/0022180 A1* | 2/2002 | Olsen et al. | 429/176 |
| 2002/0164441 A1 | 11/2002 | Amine et al. | |
| 2005/0196664 A1* | 9/2005 | Shimoyamada et al. | 429/94 |
| 2006/0251955 A1* | 11/2006 | Yata et al. | 429/50 |
| 2007/0202398 A1* | 8/2007 | Kim | 429/176 |

FOREIGN PATENT DOCUMENTS

| | | |
|---|---|---|
| JP | 61-029065 | 2/1986 |
| JP | 61-179059 | 8/1986 |
| JP | 10-270060 | 10/1998 |
| JP | 2000-149993 | 5/2000 |
| JP | 2000-173564 | 6/2000 |
| JP | 2000-294204 | 10/2000 |
| JP | 2001-52660 | 2/2001 |
| JP | 2001-084972 | 3/2001 |
| JP | 2001-243931 | 9/2001 |
| JP | 2001-325992 | 11/2001 |
| JP | 2008-235255 | 10/2008 |
| KR | 10-2001-0029825 | 4/2001 |
| KR | 10-2004-0079531 | 9/2004 |
| KR | 10-2008-0019313 | 3/2008 |
| WO | WO 01/56093 | 2/2001 |
| WO | WO 2007/061262 | 5/2007 |

OTHER PUBLICATIONS

Office Action dated Jul. 2, 2012 for corresponding KR Application No. 10-2011-0011418.

Office Action dated Jan. 29, 2013 for corresponding JP Application No. 2011-029717.

Office Action dated Jun. 5, 2013 for corresponding CN Application No. 201110070106.5.

Notice of Allowance dated Jul. 1, 2013 for corresponding KR Application No. 10-2011-0011418.

Office Action dated Oct. 29, 2013 for corresponding JP Application No. 2011-029717.

* cited by examiner

POUCH TYPE SECONDARY BATTERY AND THE FABRICATION METHOD THEREOF

RELATED APPLICATIONS

This application claims priority to and the benefit of U.S. Provisional Application No. 61/319,135, filed on Mar. 30, 2010, the entire content of which is incorporated herein by reference.

BACKGROUND

1. Field

Embodiments of the present invention relate to a pouch type secondary battery and the fabrication method thereof.

2. Related Technology

Along with the development of electronic devices such as cellular phones, notebook-sized computers, camcorders, electric motorcycles, or electric vehicles, research is currently being conducted into secondary batteries that are generally repeatedly chargeable.

Secondary batteries can be fabricated in a variety of shapes, for example, pouch-type batteries, cylinder-type batteries, or prismatic batteries. In particular, the pouch-type secondary battery typically includes an electrode assembly accommodated in a multi-layered pouch constituting a metal foil and at least one polymer layer covering the metal foil. More specifically, the electrode assembly is located in a receiving space of the pouch formed through a forming process using a punch or a die. However, as the depth of the receiving space of the pouch increases, it can become quite difficult to achieve flexibility in designing the exterior shape of the pouch, resulting in limitations in accommodating electrode assemblies having relatively large thicknesses. Thus, achieving large-capacity batteries is ultimately hindered. In addition, the fabrication method of the pouch-type secondary battery, including the forming process, may suffer from drawbacks of poor flexibility in designing the exterior shape of the pouch-type secondary battery.

SUMMARY

Embodiments of the present invention provide a pouch-type secondary battery capable of accommodating an electrode assembly having a large thickness and having increased flexibility in the design of the exterior shape of a sheath encasing the same, and the fabrication method thereof.

As described above, in the fabrication method of the pouch-type secondary battery according to an embodiment of the present invention, the pouch type secondary battery can be fabricated irrespective of the thickness of electrode assembly accommodated therein. In addition, according to the fabrication method of the pouch type secondary battery, the exterior shape of a sheath encasing the electrode assembly can be completed by performing additionally sealing. Therefore, even when the electrode assembly is relatively thick, the fabrication of the pouch type secondary battery can be easily achieved, thereby allowing the electrode assembly having a large thickness to be accommodated therein. Further, in the pouch type secondary battery according to an embodiment of the present invention and the fabrication method thereof, the exterior shape of the sheath encasing the electrode assembly can be flexibly designed.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
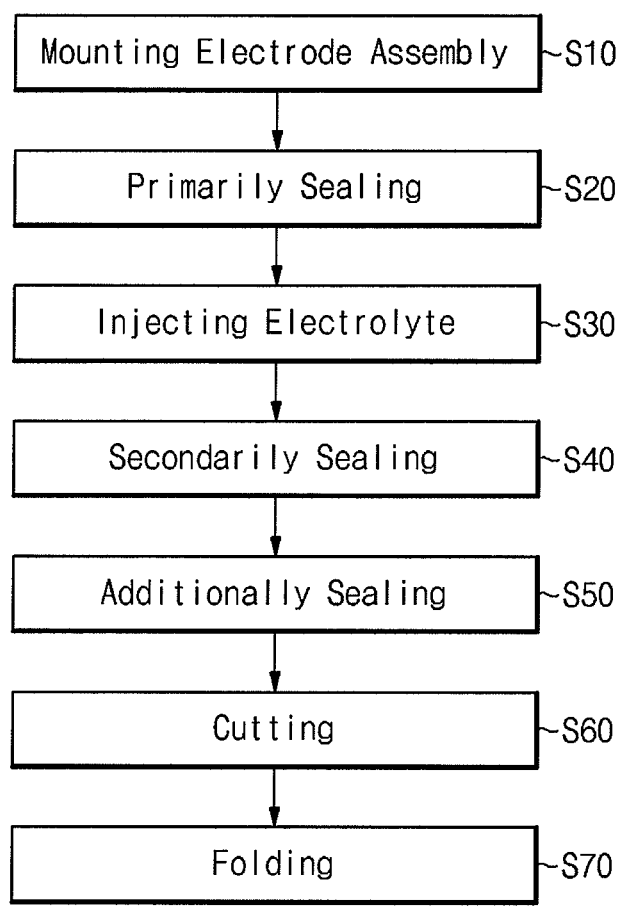
FIG. 1 is a flowchart of a fabrication method of a pouch-type secondary battery according to an embodiment of the present invention.

FIG. 1 is a flowchart of a fabrication method of a pouch-type secondary battery according to an embodiment of the present invention. FIGS. 2A through 2F illustrate the fabrication method of a pouch-type secondary battery according to an embodiment of the present invention.

Referring to FIG. 1, the fabrication method of a pouch-type secondary battery according to an embodiment of the present invention may include mounting an electrode assembly (S10), primarily sealing (S20), injecting an electrolyte (S30), and secondarily sealing (S40). In addition, the fabrication method of a pouch-type secondary battery according to an embodiment of the present invention may further include additionally sealing (S50), cutting (S60), and folding (S70).

The respective steps illustrated in FIG. 1 will now be described in more detail with reference to FIGS. 2A through 2G.

Figure 2A:
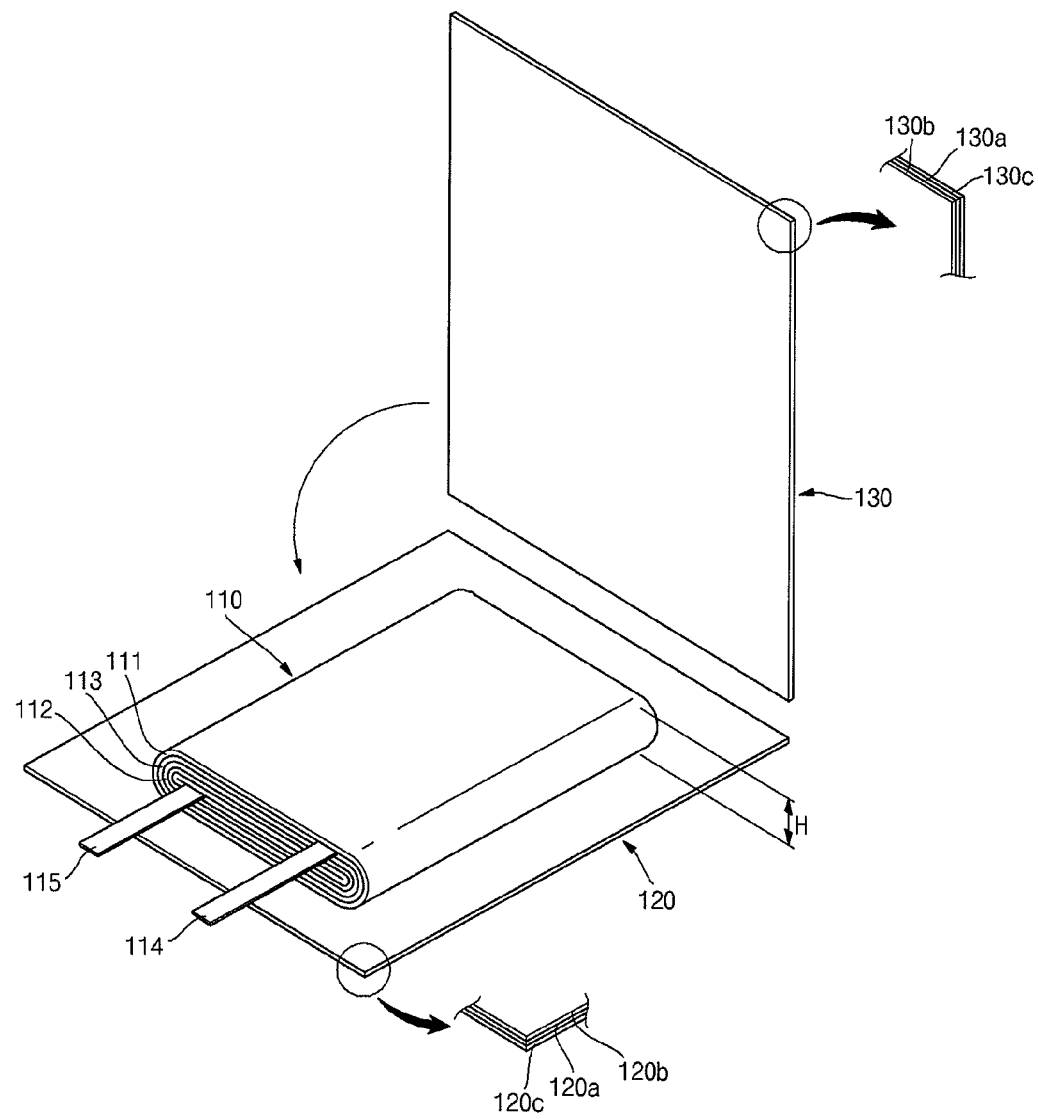
FIGS. 2A through 2F illustrate the fabrication method of a pouch-type secondary battery according to an embodiment of the present invention.

Referring to FIGS. 1 and 2A, in the mounting of the electrode assembly (S10), an electrode assembly 110 is mounted between a first pouch sheet 120 and a second pouch sheet 130.

The electrode assembly 110 may include a first electrode plate 111, a second electrode plate 112, a separator 113, a first electrode tab 114, and a second electrode tab 115.

The first electrode plate 111 may have a portion coated with either a positive electrode active material or a negative electrode active material. For example, the first electrode plate 111 may have a portion coated with the positive electrode active material.

The second electrode plate 112 may have a portion coated with either a negative electrode active material or a positive electrode active material. For example, the second electrode plate 112 may have a portion coated with the negative electrode active material.

The separator 113 may be disposed between the first electrode plate 111 and the second electrode plate 112 to prevent an electrical short between the first electrode plate 111 and the second electrode plate 112.

The first electrode tab 114 extending from the first electrode plate 111 may be drawn out a predetermined length from the first electrode plate 111. In addition, the first electrode tab 114 may be made of aluminum (Al), but the material of the first electrode tab 114 is not limited thereto. The second electrode tab 115 extending from the second electrode plate 112 may be drawn out a predetermined length from the second electrode plate 112. The second electrode tab 115 may be made of nickel (Ni), but the material of the second electrode tab 115 is not limited thereto.

The electrode assembly 110 may have a height H along its thickness direction, the height H ranging from approximately 10 mm to approximately 1000 mm, suggesting that even if the electrode assembly 110 is relatively thick, it can be applied to the fabrication method of the pouch-type secondary battery according to an embodiment of the present invention. Particularly, in the fabrication method of the pouch-type secondary battery according to an embodiment of the present invention, the exterior shape of the sheath of the pouch-type secondary battery can be completed through the additionally sealing (S50), without a forming process. Therefore, even when the electrode assembly 110 is formed to be relatively thick, the pouch-type secondary battery can be easily fabricated.

The first pouch sheet 120 may include a base layer 120a, a thermal fusion layer 120b formed on one surface of the base layer 120a, and an insulation layer 120c formed on the other surface of the base layer 120a. The base layer 120a may be formed of a metal such as aluminum (Al). The thermal fusion layer 120b may be formed of a polymer resin selected from polypropylene and polyethylene. The insulation layer 120c may be formed of at least one material selected from nylon and polyethyleneterephthalate. However, the structure and material of the first pouch sheet 120 are not limited to those illustrated above.

The second pouch sheet 130 may include a base layer 130a/130b/130c, for example, a thermal fusion layer 130b formed on one surface of the base layer 130a, and an insulation layer 130c formed on the other surface of the base layer base layer 130a. The base layer 130a may be made of a metal such as aluminum (Al). The thermal fusion layer 130b may be made of a polymer resin selected from polypropylene and polyethylene. The insulation layer 130c may be made of at least one material selected from nylon and polyethyleneterephthalate. However, the structure and material of the second pouch sheet 130 are not limited to those illustrated above.

Figure 2B:
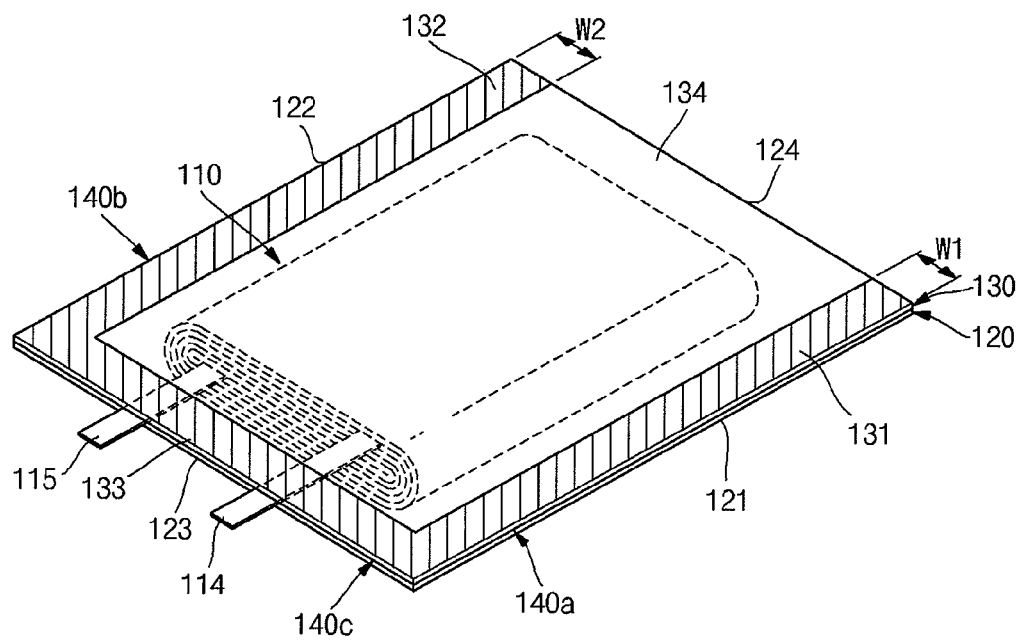

Referring to FIGS. 1 and 2B, in the primarily sealing (S20), outer side portions of the first pouch sheet 120 and the second pouch sheet 130 may be sealed to accommodate the electrode assembly 110 between the first pouch sheet 120 and the second pouch sheet 130 facing each other. Here, the sealing may be performed by thermal fusion using first and second jigs. In addition, the first pouch sheet 120 and the second pouch sheet 130 may be sealed such that the first and second electrode tabs 114 and 115 of the electrode assembly 110 are drawn out to then be exposed outside the electrode assembly 110. Further, when the first pouch sheet 120 and the second pouch sheet 130 are sealed, some portions of the first pouch sheet 120 and the second pouch sheet 130 may remain unsealed, thereby forming an electrolyte injection passage.

For example, first sides 121 and 131 of the first pouch sheet 120 and the second pouch sheet 130, which are positioned at one side of the electrode assembly 110, may be sealed to each other. In addition, second sides 122 and 132 of the first pouch sheet 120 and the second pouch sheet 130, which are positioned at the other side of the electrode assembly 110, may be sealed to each other. In addition, third sides 123 and 133 of the first pouch sheet 120 and the second pouch sheet 130, from which the first electrode tab 114 and the second electrode tab 115 are drawn out to be exposed outside the electrode assembly 110, may be sealed to each other. In contrast, fourth sides 124 and 134 of the first pouch sheet 120 and the second pouch sheet 130 may not be sealed to each other, producing an unsealed portion between the fourth sides 124 and 134 and functioning as an electrolyte injection passage.

Meanwhile, as the result of the primarily sealing (S20), sealed portions may be formed between the first pouch sheet 120 and the second pouch sheet 130, and referred to herein as first sealed portions 140a, 140b and 140c, respectively. W1 and W2 denote widths of the sealed portions positioned at opposite sides of the electrode assembly 100, i.e., at the first sides 121 and 131 and the second sides 122 and 132, respectively.

Figure 2C:
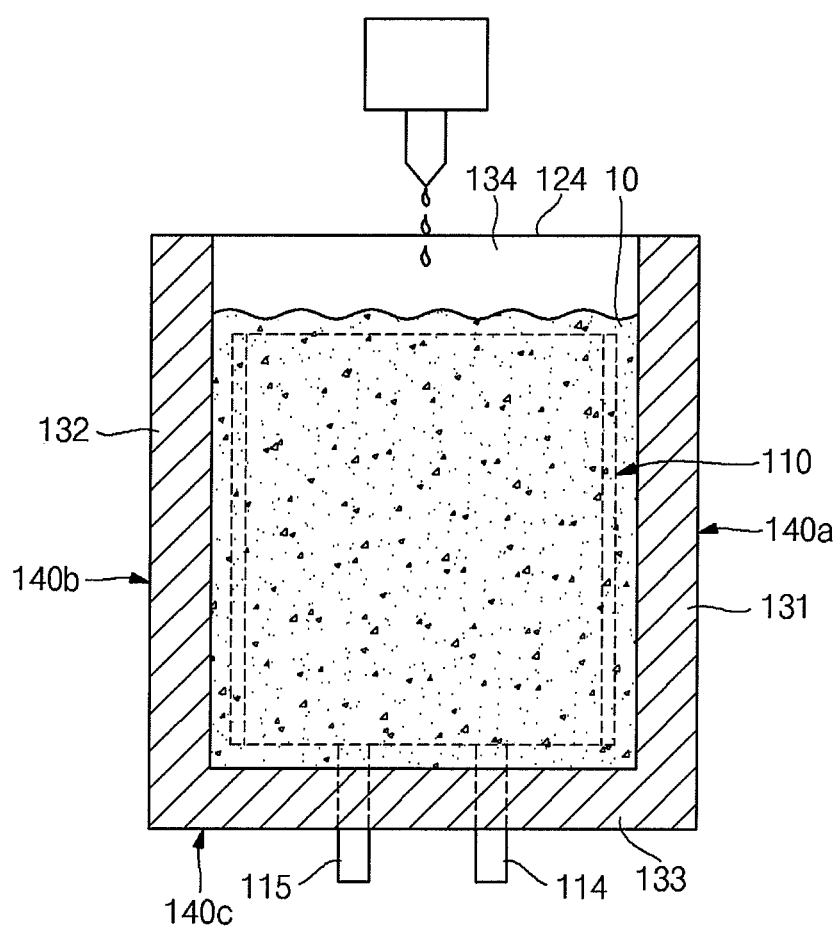

Referring to FIGS. 1 and 2C, in the injecting of the electrolyte (S30), an electrolyte 10 may be injected through the electrolyte injection passage formed from the unsealed portions in the primarily sealing (S20). Preferably, the fourth sides 124 and 134 of the first pouch sheet 120 and the second pouch sheet 130 are not sealed in the primarily sealing (S20), producing an open space serving as a passage of injecting the electrolyte.

Figure 2D:
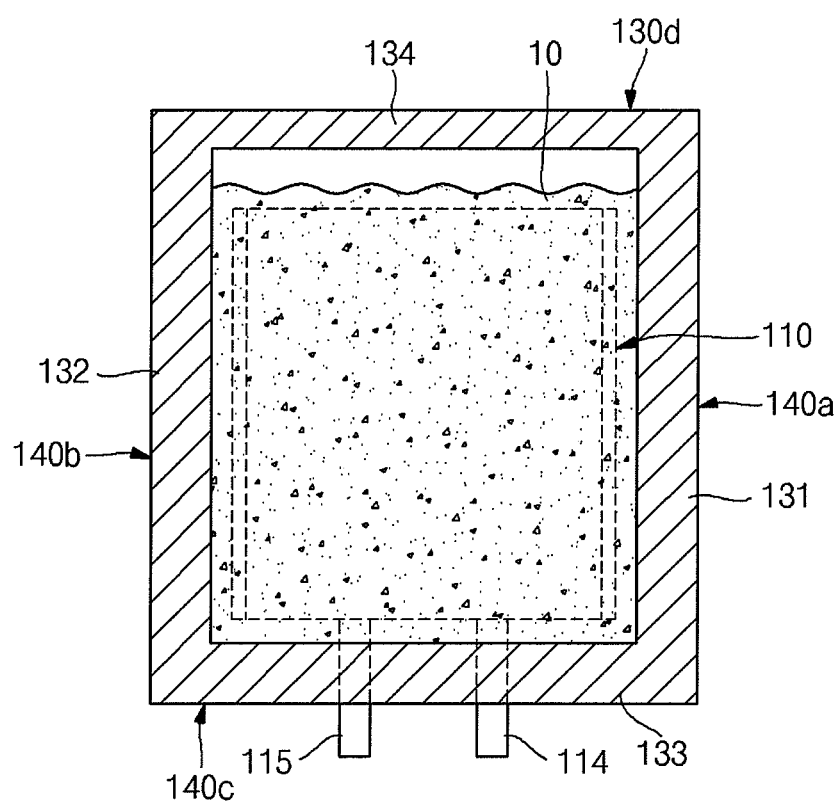

Referring to FIGS. 1 and 2D, in the secondarily sealing (S40), the electrolyte injection passage is sealed. Consequently, the electrode assembly 110 can be accommodated inside between the first pouch sheet 120 and the second pouch sheet 130 to then be hermetically sealed. Here, the sealed electrolyte injection passage is referred to herein as a second sealed portion 140d.

In another embodiment of the present invention, the first sides 121 and 131 of the first and second pouch sheets 120 and 130 may be used as the electrolyte injection passage. Here, after the second sides 122 and 132, the third sides 123 and 133, and the fourth sides 124 and 134 of the first and second pouch sheets 120 and 130 are primarily sealed and the electrolyte is then injected, the first sides 121 and 131 are secondarily sealed.

In an alternative embodiment of the present invention, the second sides 122 and 132 of the first and second pouch sheets 120 and 130 may be used as the electrolyte injection passage. In such a case, after the first sides 121 and 131, the third sides 123 and 133 and the fourth sides 124 and 134 of the first and second pouch sheets 120 and 130 are primarily sealed and the electrolyte is then injected, the second sides 122 and 132 are secondarily sealed.

In some embodiments of the present invention, the third sides 123 and 133 of the first and second pouch sheets 120 and 130 may be used as the electrolyte injection passage. Here, after the first sides 121 and 131, the second sides 122 and 132 and the fourth sides 124 and 134 of the first and second pouch sheets 120 and 130 are primarily sealed and the electrolyte is then injected, the third sides 123 and 133 are secondarily sealed.

Figure 2E:
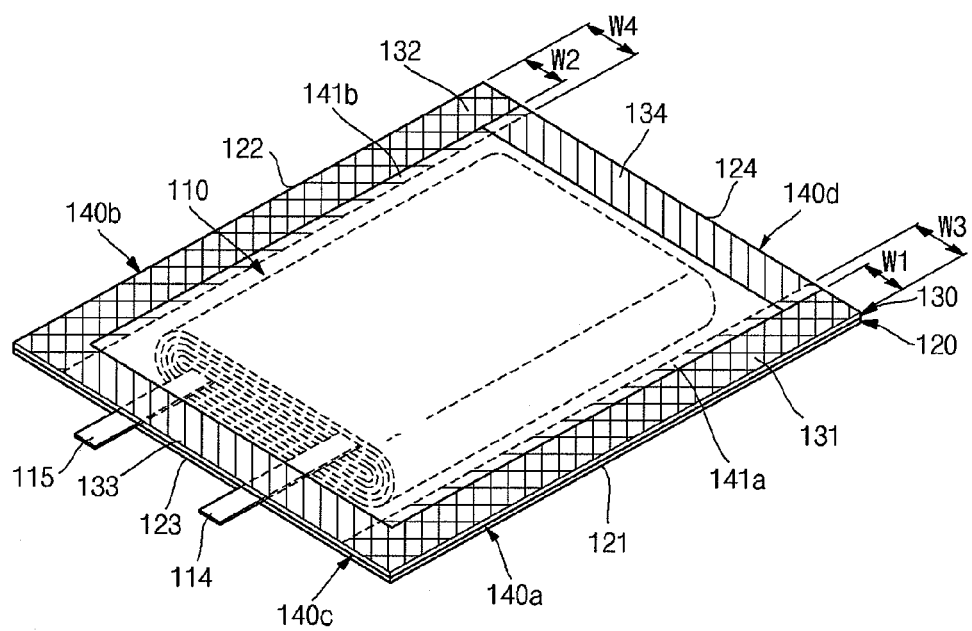

Referring to FIGS. 1 and 2E, in the additionally sealing (S50), in order to complete the final exterior shape of the pouch type secondary battery, the secondarily sealing (S40) may be followed by additionally sealing outer side portions of the first pouch sheet 120 and the second pouch sheet 130. For example, in the additional sealing (S50), the final exterior shape of the pouch type secondary battery may be completed using first and second mold jigs. Preferably, additionally sealed portions 141a and 141b may be formed at the first side 121 of the first pouch sheet 120 and at the first side 131 of the second pouch sheet 130, respectively. The additionally sealed portions 141a and 141b may also be formed at the second side 122 of the first pouch sheet 120 and at the second side 132 of the second pouch sheet 130. Further, the widths W3 and W4 of sealed portions resulting from the additional sealing (S50), positioned at the first sides 121 and 131 and the second sides 122 and 132, may be made greater than the widths W1 and W2 of the sealed portions resulting from the primarily sealing (S20). The exterior shape of the sheath of the pouch type secondary battery may be completed by performing a forming process using molds while making the widths W3 and W4 of the sealed portions resulting from the additionally sealing (S50) greater than the widths W1 and W2 of the sealed portions resulting from the primarily sealing (S20). Here, the sealed portions resulting from the additionally sealing (S50), including the first sealed portion 140a, may be formed over a relatively large area. For a better understanding of the present invention, however, only the newly sealed portions formed by the additionally sealing may be referred to herein as additionally sealed portions 141a and 141b. In other words, the additionally sealed portions 141a and 141b may correspond to portions obtained by subtracting the portion with the width W1 from the portion with the width W3 and by subtracting the portion with the width W2 from the portion with the width W4, respectively.

According to embodiments, the additional sealing may also be performed on the fourth sides 124 and 134 of the first and second pouch sheets 120 and 130. For example, although the illustrated embodiment shows that the additional sealing is performed on the first sides 121 and 131 and the second sides 122 and 132 of the first and second pouch sheets 120 and 130, the additional sealing may also be performed on the fourth sides 124 and 134 as well.

Figure 2F:
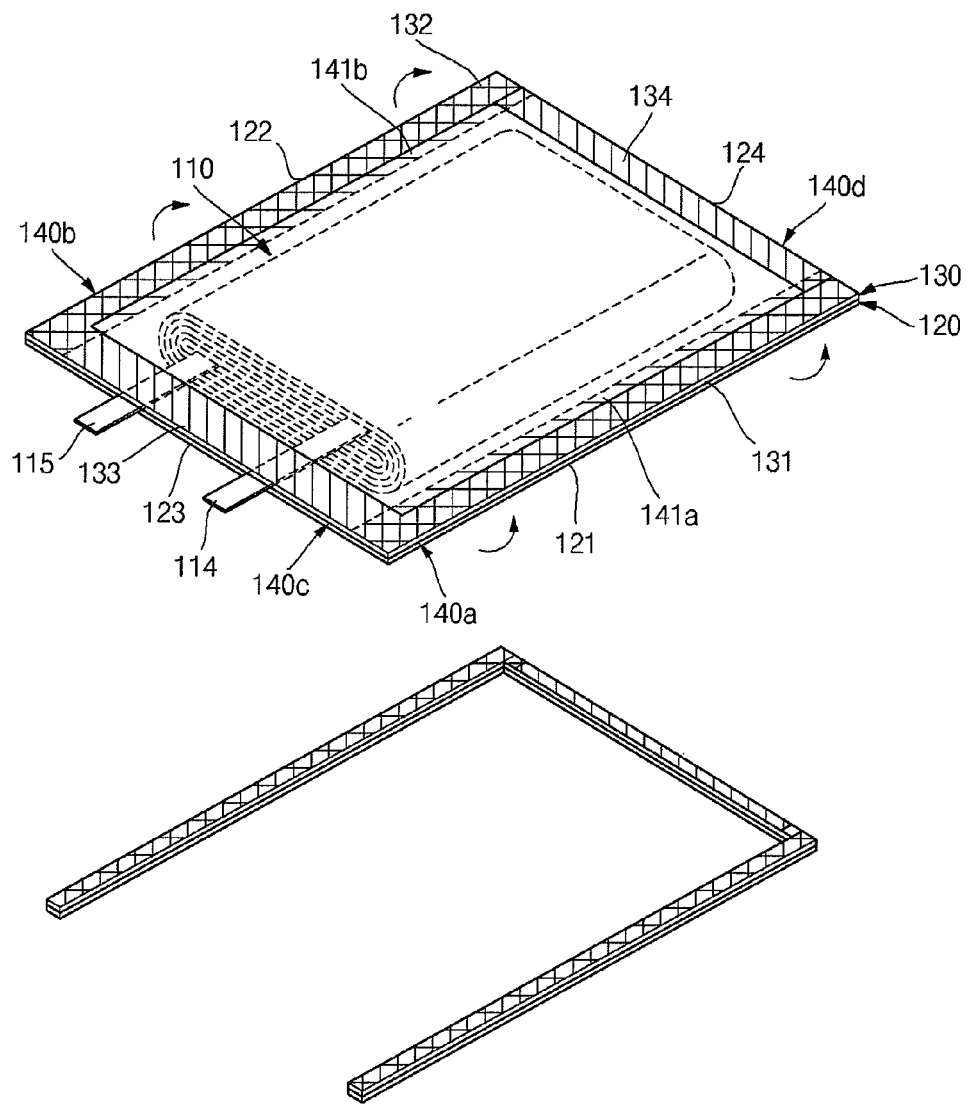

Referring to FIGS. 1 and 2F, in the cutting (S60), outer side portions of the first pouch sheet 120 and the second pouch sheet 130 may be cut for removal so as to be tailored to the use of the pouch type secondary battery. As such, the pouch type secondary battery can be made less bulky. In addition, in the folding (S70), side portions of the first pouch sheet 120 and the second pouch sheet 130 may be folded to roughly face the electrode assembly 110 so as to be tailored to the use of the pouch-type secondary battery.

Figure 3A:
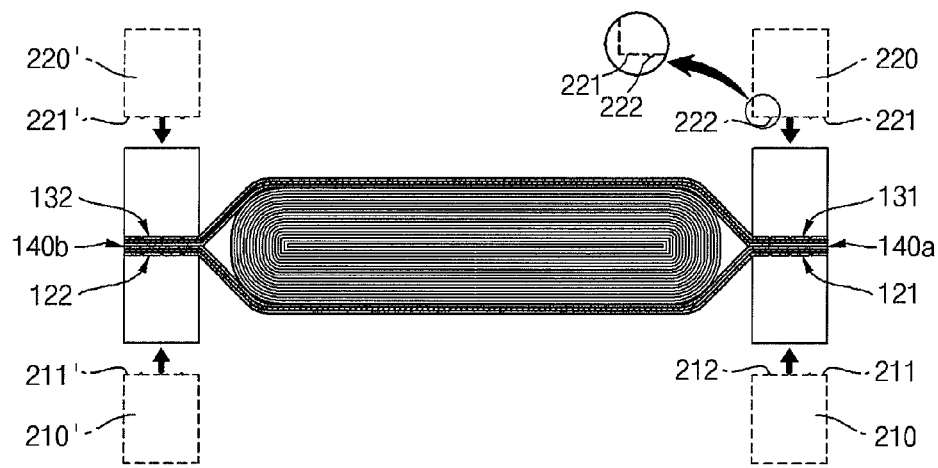
FIGS. 3A and 3B illustrate a step of primarily sealing in the fabrication method of a pouch-type secondary battery according to an embodiment of the present invention.
Figure 3B:
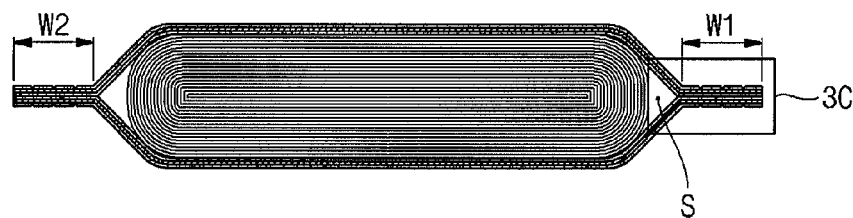
Figure 3C:
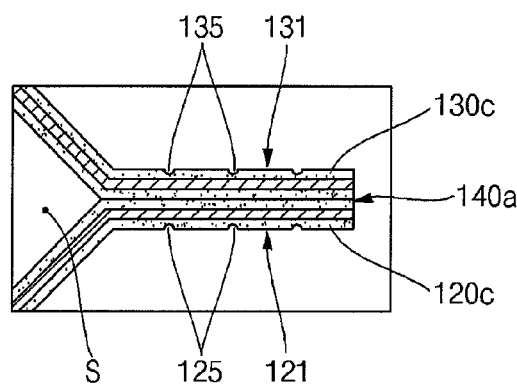
FIG. 3C is a partially enlarged view of a rectangular portion indicated by '3C' of FIG. 3B.

FIGS. 3A and 3B illustrate a step of primary sealing in the fabrication method of a pouch-type secondary battery according to an embodiment of the present invention, and FIG. 3C is a partially enlarged view of a rectangular portion indicated by '3C' of FIG. 3B.

As illustrated in FIG. 3A, in the primarily sealing (S20), a first jig 210 and a second jig 220 may be used, the first jig 210 having a compressed portion 211 and the second jig 220 having a compressed portion 221, both of the compressed portions 211 and 221 being substantially planar. In detail, outer side portions of the first pouch sheet 120 and the second pouch sheet 130 may be sealed to each other using the substantially planar, compressed portions 211 and 221 of the first jig 210 and the second jig 220 being at high temperature. For example, the first sides 121 and 131 of the first and second pouch sheets 120 and 130, positioned at one side of the electrode assembly 110 accommodated inside between the first pouch sheet 120 and the second pouch sheet 130, may be thermally fused using the substantially planar, compressed portions 211 and 221 of the first jig 210 and the second jig 220 being at high temperature. In addition, the second sides 122 and 132 of the first and second pouch sheets 120 and 130, positioned at the other side of the electrode assembly 110, may be thermally fused using another substantially planar, compressed portions 211' and 221' of first and second jig 210' and 220' being at high temperature.

In such a manner, the first sealed portion 140a and 140b, with respective width W1 and W2, may be formed at either side edge portion of the first pouch sheet 120 and the second pouch sheet 130.

Here, the substantially planar, compressed portions 211 and 221 of the first jig 210 and the second jig 220 may further include a plurality of protrusions 212 and 222 to improve the sealing efficiency of the first pouch sheet 120 and the second pouch sheet 130. According to other embodiments, the plurality of protrusions 212 and 222 may take any one shape selected among a line, a cruciform, and equivalents thereof, but aspects of the present invention are not limited thereto in plane views of the protrusions 212 and 222.

As illustrated in FIGS. 3B and 3C, the plurality of protrusions 212 and 222 formed in the substantially planar, compressed portions 211 and 221 of the first jig 210 and the second jig 220 may produce sealing marks 125 and 135 each having a predetermined pitch on the first sealed portion 140a having the width W1. The sealing marks 125 and 135 may be generally formed in the insulation layer 120c and the insulation layer 130c of the multi-layered first and second pouch sheets 120 and 130, respectively. Here, the sealing marks 125 and 135 may be formed as recesses engaged with the protrusions 212 and 222. For example, the plurality of protrusions 212 and 222 formed in the substantially planar, compressed portions 211 and 221 of the first jig 210 and the second jig 220 may be transferred to the first sealed portion 140a in forms of recesses. Further, the sealing marks 125 and 135 may take any one shape selected among a line, a cruciform, and equivalents thereof, but aspects of the present invention are not limited thereto in plane views of the sealing marks 125 and 135.

Meanwhile, in the primarily sealing (S20), a space S may be formed between the first sealed portion 140a and the electrode assembly 110. The space S may serve as a passage through which electrolyte can flow smoothly in the injection of the electrolyte (S30). In addition, the electrolyte may be contained in the space S for a predetermined period of time, thereby allowing the electrolyte to be rapidly impregnated into the electrode assembly 110. For example, the space S may function to improve the efficiency of impregnating the electrolyte into the electrode assembly 110.

In the primarily sealing (S20), determination of the exterior shape of the pouch-type secondary battery is still uncompleted. In practice, it is in the additional sealing (S50) subsequent to the primary sealing (S20), specifically through a forming process using molds, that the exterior shape of the pouch type secondary battery can be completely determined.

Figure 4A:
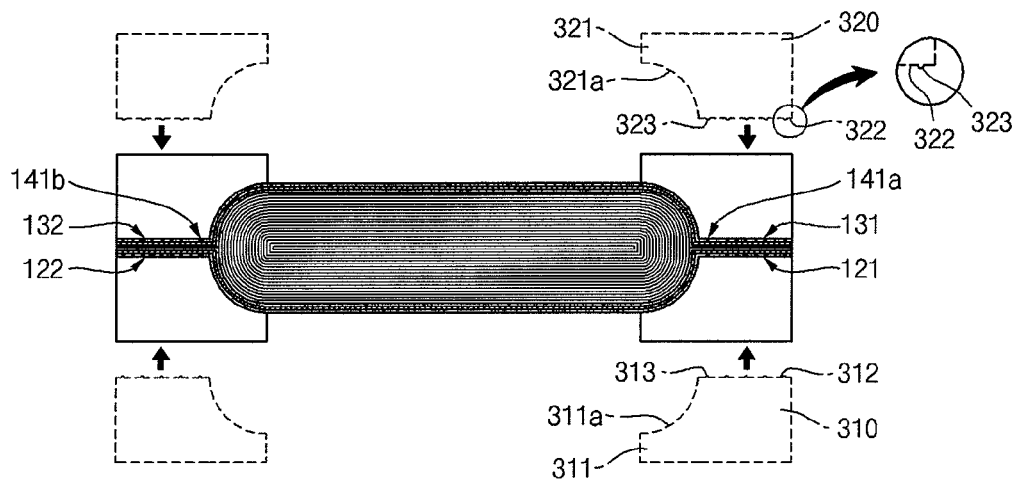
FIGS. 4A and 4B illustrate a step of additionally sealing in the fabrication method of a pouch-type secondary battery according to an embodiment of the present invention.
Figure 4B:
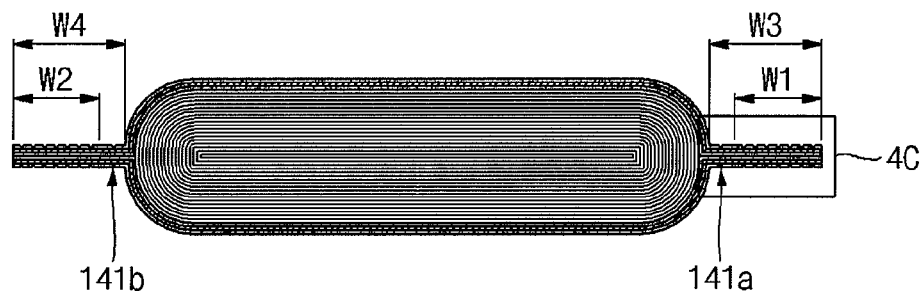
Figure 4C:
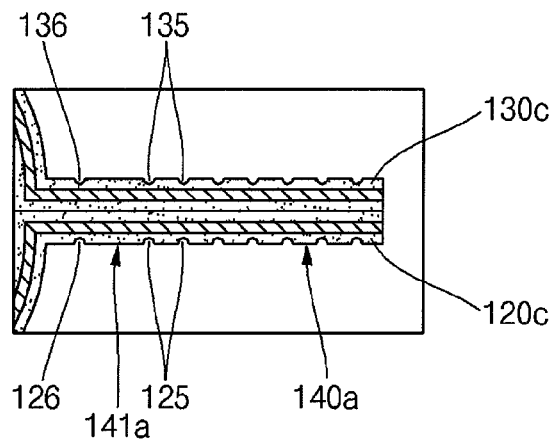
FIG. 4C is a partially enlarged view of a rectangular portion indicated by '4C' of FIG. 4B.

FIGS. 4A and 4B illustrate a step of additional sealing in the fabrication method of a pouch type secondary battery according to an embodiment of the present invention, and FIG. 4C is a partially enlarged view of a rectangular portion indicated by '4C' of FIG. 4B.

As illustrated in FIG. 4A, in the additional sealing step (S50), a first mold jig 310 and a second mold jig 320 may be used. For example, after the secondary sealing step (S40), some outer side portions of the first pouch sheet 120 and the second pouch sheet 130 may be additionally sealed using the first mold jig 310 and the second mold jig 320 of the first pouch sheet 120 and the second pouch sheet 130. Further, the final exterior shape of the pouch-type secondary battery may be determined through the additional sealing step (S50). In addition, as the result of the additional sealing (S50), the space S (see FIGS. 3A and 3B) provided between the electrode assembly 110 and the first sealed portion 140a (140b) may be removed, thereby making the pouch-type secondary battery more compact. For example, as illustrated in FIG. 4A, external surfaces of the electrode assembly 110 may be completely covered by the first pouch sheet 120 and the second pouch sheet 130. In other words, curved portions of the wound electrode assembly 110 may be completely covered by the first pouch sheet 120 and the second pouch sheet 130, thereby achieving hermetically sealing without a gap. Accordingly, curved portions are also formed in the first pouch sheet 120 and the second pouch sheet 130 to correspond to the curved portions of the wound electrode assembly 110.

Although FIG. 4A illustrates the wound electrode assembly 110 having a cross section of a substantially elliptical shape, the invention can also be applied to a stack-type electrode assembly having a cross section of a substantially rectangular shape. For example, in case of using the stack-type electrode assembly having a cross section of a substantially rectangular shape, angled portions of the electrode assembly 110 can be completely covered by the first pouch sheet 120 and the second pouch sheet 130, thereby achieving hermetic sealing without a gap.

As described above, the portions subjected to the additional sealing are referred to herein as the additionally sealed portions 141a and 141b. The additionally sealed portion 141a may be formed at the first sides 121 and 131 of the first pouch sheet 120 and the second pouch sheet 130. In addition, the additionally sealed portion 141b may be formed at the second sides 122 and 132 of the first pouch sheet 120 and the second pouch sheet 130. Here, the additional sealing may make widths W3 and W4 of the portions sealed to the first sides 121 and 131 and the second sides 122 and 132 greater than the widths W1 and W2 of the portions sealed to the first sides 121 and 131 and the second sides 122 and 132 in the primarily sealing (S20). Here, the portions resulting from the additional sealing, including the first sealed portions 140a, may be formed over a larger area than an area of the first sealed portions 140a. For a better understanding of the present invention, however, portions obtained by subtracting the portion with the width W1 and W2 from the portion with the width W3, and by subtracting the portion with the width W2 from the portion with the width W4, are referred to herein as the additionally sealed portions 141a and 141b, respectively.

Meanwhile, the first mold jig 310 and the second mold jig 320 may include molded portions 311 and 321, and compressed portions 312 and 322, the molded portions 311 and 321 determining the exterior shapes of the first pouch sheet 120 and the second pouch sheet 130, and the compressed portions 312 and 322 being substantially planar and forming the additionally sealed portions 141a and 141b. The molded portions 311 and 321 may include curves 311a and 321a to form the exterior shape of the pouch type secondary battery, respectively. In other words, the curves 311a and 321a of the molded portions 311 and 321 compress the first pouch sheet 120 and the second pouch sheet 130, or, inward portions of the additionally sealed portions 141a and 141b, thereby completing the exterior shape of the pouch type secondary battery. In addition, the substantially planar, compressed portions 312 and 322 may include a plurality of protrusions 313 and 323, respectively, to improve the sealing efficiency of the first and second pouch sheets 120 and 130.

Accordingly, as illustrated in FIGS. 4B and 4C, sealing marks 126 and 136 each having a predetermined pitch are created on surfaces of the additionally sealed portions 141a and 141b having the width W3 or W4. For example, the sealing marks 126 and 136 are also transferred to the additionally sealed portion 141a by the plurality of protrusions 313 and 323 formed in the compressed portions 312 and 322 of the first and second mold jigs 310 and 320.

Here, the additional sealing can create a pitch difference between the sealing marks 125 and 135 formed in the first sealed portions 140a and between the sealing marks 126 and 136 formed in the additionally sealed portion 141a. For example, a pitch between the sealing marks 125 and 135 formed in the first sealed portions 140a may be smaller than that between the sealing marks 126 and 136 formed in the additionally sealed portion 141a. In other words, the number of the sealing marks 125 and 135 formed in the first sealed portions 140a may be greater than that of the sealing marks 126 and 136 formed in the additionally sealed portion 141a. This is because the additional sealing has been performed twice on the first sealed portion 140a and once on the additionally sealed portion 141a.

Figure 5A:
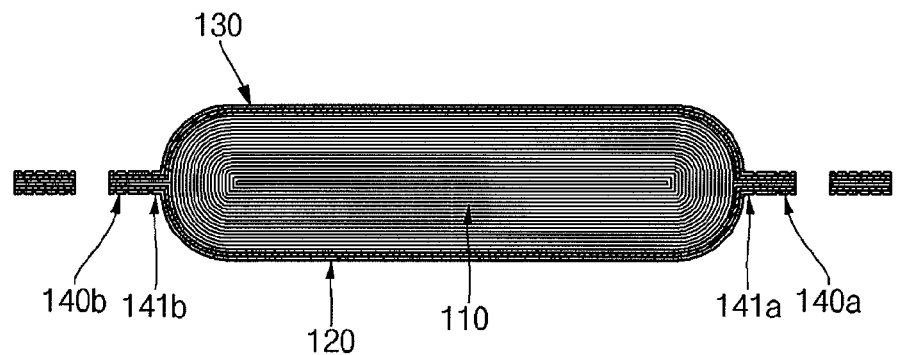
FIGS. 5A and 5B illustrate steps of cutting and folding in the fabrication method of a pouch-type secondary battery according to an embodiment of the present invention.
Figure 5B:
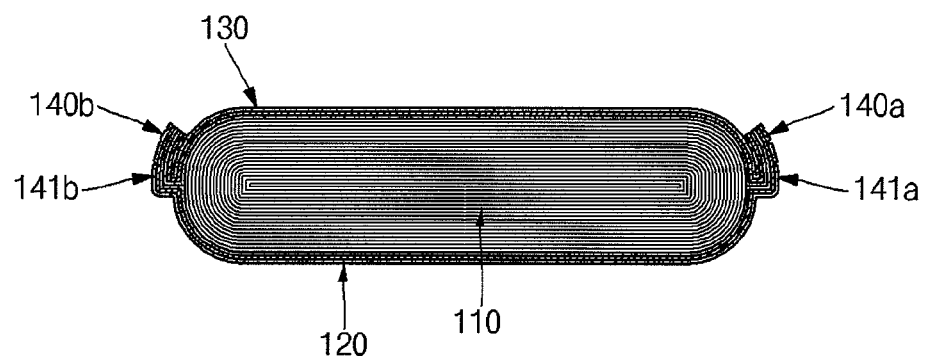

FIGS. 5A and 5B illustrate steps of cutting and folding in the fabrication method of a pouch-type secondary battery according to an embodiment of the present invention.

As illustrated in FIG. 5A, in the cutting step (S60), unnecessary side portions of the first pouch sheet 120 and the second pouch sheet 130 may be cut for removal.

As illustrated in FIG. 5B, in the folding step (S70), the side portions of the first pouch sheet 120 and the second pouch sheet 130 may be folded to face the electrode assembly 110. For example, the first sealed portions 140a and 140b and the additionally sealed portions 141a and 141b formed in the first pouch sheet 120 and the second pouch sheet 130 may be folded approximately 90° either upward or downward. In some cases, the sealed portions in the left and the sealed portions in the right may be folded in opposite directions. After the cutting (S60) and the folding (S70) steps, the pouch-type secondary battery can be miniaturized.

Figure 6:
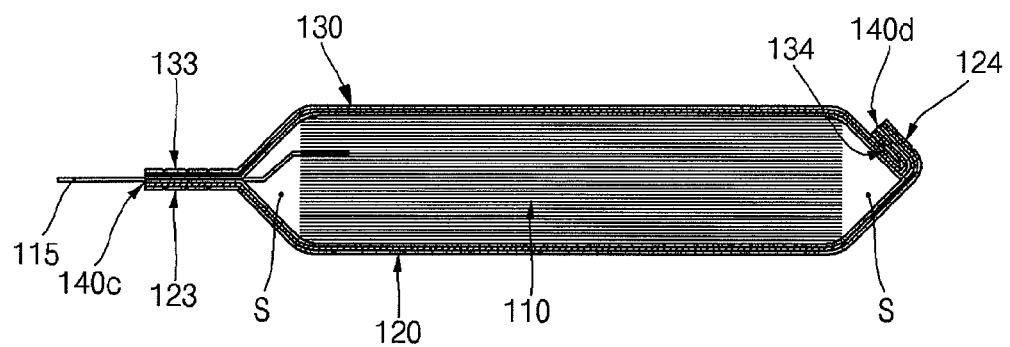
FIG. 6 is a cross-sectional view schematically illustrating a transversely cut section of a pouch-type secondary battery according to an embodiment of the present invention.

FIG. 6 is a cross-sectional view schematically illustrating a transversely cut section of a pouch-type secondary battery according to an embodiment of the present invention.

As illustrated in FIG. 6, the second sealed portion 140d formed at the fourth side 124 of the first pouch sheet 120 and at the fourth side 134 of the second pouch sheet 130 may also be folded either upward or downward. Here, since the additionally sealing has not been performed on the second sealed portion 140d, a space S for accommodating electrolyte may be provided between the electrode assembly 110 and the second sealed portion 140d.

Meanwhile, the fourth side 124 of the first pouch sheet 120 and the fourth side 134 of the second pouch sheet 130 may be folded in the same direction as the first sealed portions 140a and 140b and the additionally sealed portions 141a and 141b, or in the opposite direction to the first sealed portions 140a and 140b and the additionally sealed portions 141a and 141b, but the folding directions of the sealed portions are not limited to those illustrated. The folding directions of the sealed portions may vary in various manners according to the exterior shape of a sheath encasing the pouch type secondary battery according to the present invention.

Figure 7A:
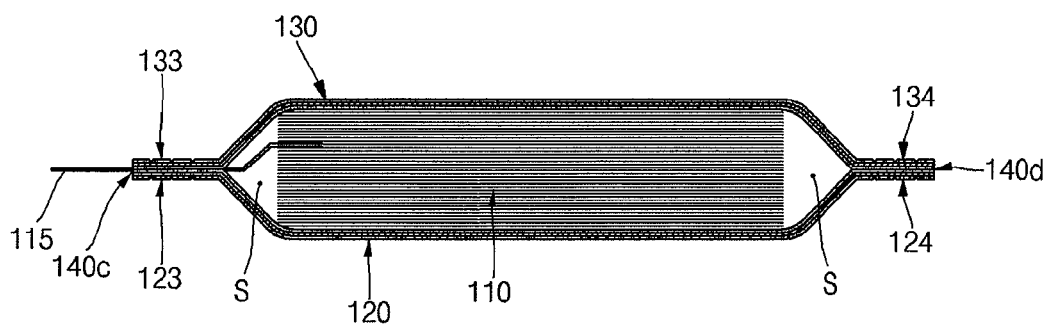
FIGS. 7A through 7C illustrate steps of primarily sealing fourth sides of first and second pouch sheets, additionally sealing and folding in the fabrication method of a pouch-type secondary battery according to an embodiment of the present invention.
Figure 7B:
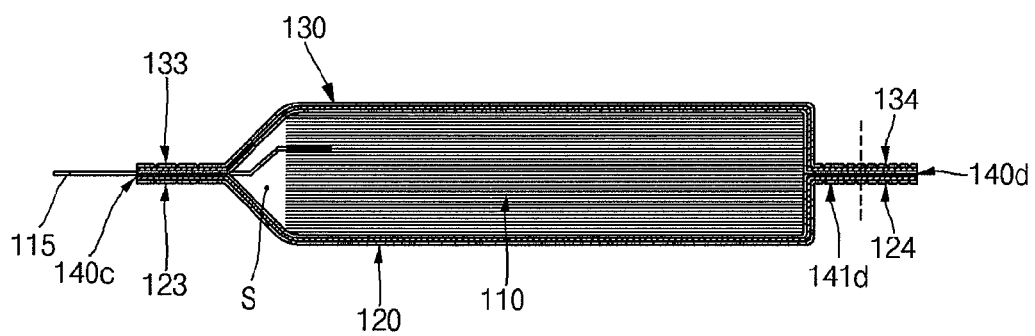
Figure 7C:
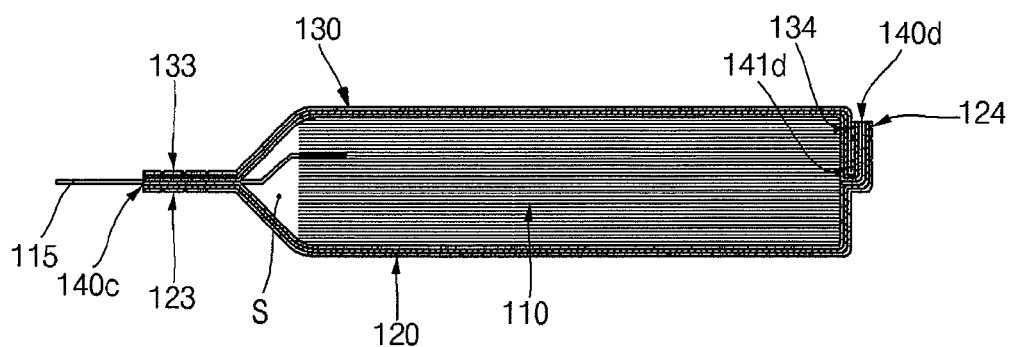

FIGS. 7A through 7C illustrate steps of primarily sealing fourth sides of the first and second pouch sheets, additionally sealing and folding in the fabrication method of a pouch-type secondary battery according to an embodiment of the present invention.

As illustrated in FIG. 7A, as the result of the secondary sealing, the second sealed portion 140d may be formed at the fourth sides 124 and 134 of the first and second pouch sheets 120 and 130. In addition, since the fanning process using molds has not been performed at this stage, the space S still exists between the electrode assembly 110 and the second sealed portion 140d. The second sealed portion 140d may include a plurality of sealing marks formed using protrusions formed in the jigs, which has already been described above.

As illustrated in FIG. 7B, as the result of the additional sealing, the additionally sealed portion 141d may be formed at the fourth sides 124 and 134 of the first and second pouch sheets 120 and 130. The additional sealing can remove the space S provided between the electrode assembly 110 and the second sealed portion 140d. For example, the first and second pouch sheets 120 and 130 may be hermetically sealed to one side edge portion of the electrode assembly 110 without a gap.

In addition, as described above, the additionally sealed portion 141d may include a plurality of sealing marks formed by the protrusions formed in the mold jigs. Of course, sealing marks may be additionally formed at the second sealed portion 140d as well. Eventually, the second sealed portion 140d may include a relatively large number of sealing marks. In addition, after performing the additional sealing, unnecessary portions of the sealed portions may be cut for removal.

As illustrated in FIG. 7C, the second sealed portion 140d and the additionally sealed portion 141d may be folded either upward or downward. Likewise, the second sealed portion 140d and the additionally sealed portion 141d may be folded in the same direction as the first sealed portions 140a and 140b and the additionally sealed portions 141a and 141b, or in the opposite direction to the first sealed portions 140a and 140b and the additionally sealed portions 141a and 141b, but the folding directions of the sealed portions are not limited to those illustrated.

As described above, although specific exemplary embodiments have been disclosed herein, they are to be interpreted in a descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of forming a secondary battery comprising:
    positioning an electrode assembly between a first pouch sheet and a second pouch sheet;
    initially sealing outer portions of the first pouch sheet and of the second pouch sheet on at least one side of the first and second pouch sheets so that a space is formed between the sealed portion and the electrode assembly wherein the space extends the length of the electrode assembly on two sides of the electrode assembly;
    injecting an electrolyte into the pouch after initially sealing outer portions of the first pouch sheet and of the second pouch sheet on at least one side of the first and second pouch sheets wherein the electrolyte travels the length of the length of the electrode assembly in the spaces; and
    additionally sealing outer portions of the first pouch sheet and of the second pouch sheet on the at least one side of the first and second pouch sheets wherein additionally sealing outer portions of the first pouch sheet and the second pouch sheets results in sealing more of the same outer portions of the first pouch sheet and of the second pouch sheet than was sealed when the outer portion of the first pouch sheet and the inner portions of the second pouch sheet was sealed so that the space formed between the sealed portion and the electrode assembly is removed.

2. The method of claim 1, wherein additionally sealing comprises sealing again the outer portions of the at least one side that is initially sealed, and sealing additional outer portions of the at least one side closer to the electrode assembly that is not initially sealed.

3. The method of claim 1, wherein initially sealing outer portions further comprises:
    first sealing outer portions of the first pouch sheet and of the second pouch sheet on first, second and third sides of the first and second pouch sheets; and
    second sealing outer portions of the first pouch sheet and of the second pouch sheet on a fourth side of the first and second pouch sheets.

4. The method of claim 3, further comprising injecting an electrolyte through the fourth side of the first pouch sheet and of the second pouch sheet before second sealing the outer portions of the first pouch sheet and the second pouch sheet on the fourth side.

5. The method of claim 3, wherein the electrode assembly comprises:
    a first electrode plate having a first electrode tab extending from the first side;
    a second electrode plate having a second electrode tab extending from the first side; and
    a separator in between the first electrode plate and the second electrode plate.

6. The method of claim 5, wherein the fourth side is opposite to the first and second electrode tabs extending from the first side.

7. The method of claim 3, wherein the additionally sealing further comprises additionally sealing the outer portions of the fourth side of the first and second pouch sheets.

8. The method of claim 1, wherein initially sealing the outer portions encloses a space with the electrode assembly between the first pouch sheet and the second pouch sheet.

9. The method of claim 8, wherein additionally sealing the outer portions eliminates the space.

10. The method of claim 1, wherein the secondary battery has a cross section that is substantially round or angular after additionally sealing the outer portions.

11. The method of claim 1, wherein the initially sealing comprises pressing and thermally fusing outer portions of the first and second pouch sheets on at least three sides of the first and second pouch sheets.

12. The method of claim 1, wherein the initially sealing and the additionally sealing comprise pressing the outer portions of the first and second pouches with upper and lower jigs having a plurality of protrusions to form a plurality of corresponding seal marks on the outer portions of the first and second pouch sheets.

13. The method of claim 1, wherein the additionally sealing further comprises using mold to form shapes of at least a part of the outer portions of the first and second pouch sheets.

14. The method of claim 1, wherein the secondary battery has a thickness that ranges from approximately 10 mm to approximately 1000 mm.

15. A secondary battery comprising:
    an electrode assembly positioned between a first pouch sheet and a second pouch sheet,
        wherein outer portions of the first pouch sheet and of the second pouch sheet are sealed together on at least one side of the first and second pouch sheets, and
        wherein the outer portions comprise a first plurality of seal marks having a first pitch difference between the seal marks, and a second plurality of seal marks having a second pitch difference between the seal marks.

16. The secondary battery of claim 15, wherein the second plurality of seal marks is closer to the electrode assembly and the second pitch difference is larger than the first pitch difference.

17. The secondary battery of claim 15, wherein the seal marks comprise grooves, protrusions, lines or crosses.

18. The secondary battery of claim 15, wherein the first plurality of seal marks is formed on four sides of the first and second pouch sheets, and the second plurality of seal marks is formed on at least one side of the four sides of the first and second pouch sheets, wherein electrode tabs connected to the electrode assembly extend through another side of the four sides of the first and second pouch sheets that only has the first plurality of seal marks.

19. A method of forming a secondary battery comprising:
- positioning an electrode assembly between a first pouch sheet and a second pouch sheet;
- first sealing outer portions of the first pouch sheet and of the second pouch sheet on at least one side of a first, a second and a third side of the first and second pouch sheets so that a space is formed between the electrode assembly and the sealed portions wherein the space extends the length of the electrode assembly on two sides of the electrode assembly;
- injecting an electrolyte through unsealed outer portions of the first pouch sheet and the second pouch sheet on a fourth side of the first and second pouch sheets wherein the electrolyte travels the length of the length of the electrode assembly in the spaces; and
- second sealing outer portions of the first pouch sheet and of the second pouch sheets on the fourth side of the first and second pouch sheets; and
- additionally sealing outer portions of the first pouch sheet and of the second pouch sheet on at least one side of the first and second pouch sheets wherein the additional sealing outer portions results in more of the same outer portions of the first and second pouch sheet being sealed than was sealed in the first sealing and wherein the electrolyte is injected through the unsealed outer portions prior to additionally sealing the outer portions so that the space is substantially removed.

20. The method of claim 19, wherein first sealing comprises sealing outer portions of the first pouch sheet and of the second pouch sheet on the first, the second and the third sides of the first and second pouch sheets.

* * * * *